United States Patent [19]
Lidke et al.

[11] Patent Number: 5,790,150
[45] Date of Patent: Aug. 4, 1998

[54] METHOD FOR CONTROLLING AN INK JET PRINTER IN A MULTIPASS PRINTING MODE

[75] Inventors: Steven L. Lidke, Brooklyn Park; Paul R. Erickson, Prior Lake; Jeff D. Pagel, Inver Grove Heights, all of Minn.

[73] Assignee: Colorspan Corporation, Eden Prairie, Minn.

[21] Appl. No.: 197,966

[22] Filed: Feb. 17, 1994

[51] Int. Cl.$^6$ .................. B41J 2/15; B41J 23/00; B41J 2/21

[52] U.S. Cl. .................. 347/41; 347/37; 347/43

[58] Field of Search .................. 347/40, 41, 43, 347/37

[56] References Cited

U.S. PATENT DOCUMENTS

| | | |
|---|---|---|
| 3,769,631 | 10/1973 | Hill et al. . |
| 4,198,642 | 4/1980 | Gamblin . |
| 4,251,823 | 2/1981 | Sagae ..................... 347/12 |
| 4,333,112 | 6/1982 | Matsumoto ..................... 358/298 |
| 4,463,359 | 7/1984 | Ayata et al. ..................... 347/56 |
| 4,533,928 | 8/1985 | Sugiura et al. ..................... 347/43 X |
| 4,540,996 | 9/1985 | Saito ..................... 347/43 |
| 4,622,560 | 11/1986 | Withoos et al. . |
| 4,748,453 | 5/1988 | Lin et al. . |
| 4,833,491 | 5/1989 | Rezanka ..................... 347/43 |
| 4,855,752 | 8/1989 | Bergstedt ..................... 347/41 |
| 4,864,328 | 9/1989 | Fischbeck . |
| 4,920,355 | 4/1990 | Katerberg . |
| 4,920,358 | 4/1990 | Takei . |
| 4,965,593 | 10/1990 | Hickman ..................... 347/41 |
| 4,967,203 | 10/1990 | Doan et al. . |
| 4,969,758 | 11/1990 | Sanders, Jr. et al. . |
| 4,999,646 | 3/1991 | Trask . |
| 5,049,898 | 9/1991 | Arthur et al. . |
| 5,070,345 | 12/1991 | Lahut et al. . |
| 5,075,689 | 12/1991 | Hoisington . |
| 5,239,312 | 8/1993 | Merna . |
| 5,422,666 | 6/1995 | Koyama ..................... 347/41 |
| 5,500,661 | 3/1996 | Matsubara et al. ..................... 347/41 |

FOREIGN PATENT DOCUMENTS

| | | |
|---|---|---|
| A0408071 | 1/1991 | European Pat. Off. . |
| A0539157 | 4/1993 | European Pat. Off. . |

*Primary Examiner*—David F. Yockey
*Attorney, Agent, or Firm*—Kinney & Lange, P.A.; Paul H. McDowall

[57] ABSTRACT

A printer controller for an ink jet printer controls a print head to selectively print only a portion of the print dots at pixels locations in a print swath during each pass of a print carriage across a print medium. At least four passes are made before the print medium is advanced to a new print swath. The portion of the pixel locations for each pass are chosen such that no pixel location to be printed on that pass is orthogonally or diagonally adjacent to any other pixel location to be printed in the same pass. To improve linear print speed, the print carriage is moved across the print medium at a speed that is greater than a maximum firing rate for the print head divided by a print dot density for the ink jet printer.

7 Claims, 5 Drawing Sheets

METHOD FOR CONTROLLING AN INK JET PRINTER IN A MULTIPASS PRINTING MODE

FIELD OF THE INVENTION

The present invention relates generally to ink jet printers. More particularly, the present invention relates to a method and apparatus for controlling a multiple print nozzle ink jet printer so as to increase both the print quality and printing speed of the ink jet printer when operating in a multipass printing mode.

BACKGROUND OF THE INVENTION

The technology of multiple print nozzle ink jet printers is well known. In a typical multiple print nozzle ink jet printer, an ink jet cartridge having an ink reservoir and a print head with multiple print nozzles is mounted on a print carriage such that the print head is positioned opposite a print medium. Each one of the multiple print nozzles selectively dispenses a droplet of liquid ink onto a print location on the print medium, commonly referred to as a pixel element or pixel, in order to produce a print dot. As the print carriage moves across the print medium at a generally constant speed, each print nozzle selectively prints print dots on pixels that comprise a pixel row corresponding to that print nozzle. When the print carriage has completed printing an entire print swath, the print medium is advanced and another print swath is printed. A print swath is defined as a distinct strip of print media that determines the effective length of the printing zone of the ink jet printed as measured by a full width of a print head's effective printing zone. The print media can be characterized as comprising a series of these discrete strips. A single traverse of the print heads across the print media is defined as a pass.

One technique which has been used in an effort to increase the print quality of multiple print nozzle ink jet printers is to operate in a multipass or interlaced printing mode where multiple passes of the print carriage across the same print medium are made for each print swath. Examples of various multipass printing modes for multiple print nozzle ink jet printers include U.S. Pat. Nos. 4,622,560, 4,748,453, 4,855, 752, 4,864,328, 4,920,358, 4,967,203, 4,999,646, 5,070,345, 5,075,689 and 5,239,312.

By operating a multiple print nozzle ink jet printer in a multipass mode, it is possible to decrease the well-known problems of horizontal banding between successive print swathes, for example. In multipass mode, a print head will typically only print a portion of the print swath width in each full pass across the print media and several print passes are used to print the entire print swath width. This printing technique prints each individual pixel line using different print nozzles on every pass. This techniques ensures that dot placement errors are distributed along each particular pixel line on the print media such that subsequent passes of the print head place dots within the print swath at slightly different positions within the printing zones orthogonal coordinates. Without this printing technique, inaccuracy of dot placement on print media from differing print nozzle alignments of the separate print nozzles on the print head may cause banding. The banding results from dots being deposited on the print media outside of the desired location of the dot such that white spaces between some dots are over saturated with ink in some regions and sparsely inked in areas between other dots. The problems of horizontal banding are graphically apparent on color output from single or dual pass color ink jet printers.

While the print quality of a multiple print nozzle ink jet printer may be enhanced by using a multipass printing mode, the problem is that the overall print speed of the ink jet printer is generally decreased in direct relation to the number of passes used to print each print swath. Consequently, it would be desirable to provide a method and apparatus for controlling a multiple print nozzle ink jet printer that could increase the print quality and while maintaining linear print speed of the ink jet printer when operating in a multipass printing mode.

In most ink jet printers, there is a one-to-one relationship between each droplet of liquid ink and each pixel element to be printed. Because each droplet contains essentially the same volume of ink, each droplet produces a print dot 136 on print medium 106 that is essentially the same size as every other print dot 136. In color ink jet printers, there are generally two different ways to use these dots so as to represent color images. In Dot On Dot (DOD) printing, a number of different cartridges, each having a different color liquid ink, generate an individual pixel by printing selected droplets of the different color liquid inks over one another in the same pixel location on the print medium. Because the colored inks are non-opaque, the color seen by the human eye is the composite of all of the colors printed at the pixel location. In Dot Next To Dot (DND) printing, the same cartridge prints selected droplets of the different color liquid inks next to one another. Because the dots are very small, the color seen by the human eye is an integration of the different colors that are next to one another combined into a single perceived color. Although the preferred embodiment of the present invention is directed to a DOD color ink jet printer, the multipass printing mode of the present invention is equally applicable to monochromatic ink jet printers and to DND color ink jet printers which are multiple print nozzle printers capable of printing at least two adjacent pixel rows 132 as print carriage 102 is moved across print medium 106.

Ink jet printers use a variety of techniques to generate and dispense the ink droplets as the print carriage moves across each swath. One standard technique is to have a thermally-activated print head that has a firing chamber for each print nozzle that heats and vaporizes a small portion of ink immediately behind a predetermined quantity of ink that will form the ink droplet to be ejected on toward the print medium. In a thermal print head, the vapor bubble ejects the ink droplet from the firing chamber and, after a period of time, the vapor bubble aspirates and allows the next quantity of ink to enter the firing chamber. Another standard technique is to have an electrostatically-activated print head that has a firing chamber for each print nozzle that either repels or accelerates a predetermined quantity of ink that will form the ink droplet to be ejected toward the print medium. In an electrostatic print head, an electrostatic repulsion or attraction is used to eject the ink droplet from the firing chamber and, again, after a period of time the next quantity of ink for the next pixel to be printed enters the firing chamber. Still another technique is to use a piezo-electric print head that has a firing chamber for each print head that is controlled by a pair small piezo-electric elements within each print nozzle. In a piezo-electric print head, the pair of piezo-electric elements are pulsed in such a manner as to produce a pumping action in the firing chamber which ejects the current ink droplet, while simultaneously producing a vacuum to draw the ink for the next ink droplet into the firing chamber. Because the present invention is directed to controlling the manner in which the print heads are fired, and not to the specific motive force used to eject the ink droplets from the print head, the present invention is equally applicable to these and many other types of ink jet print heads.

In almost all print heads which have a firing chamber 130 and an ink reservoir 122, the capillary action and surface tension effects of the liquid ink moving from ink reservoir 122 to firing chamber 130 during the reload process requires a finite period of time. Typically, the reload process will include at least two somewhat distinct time periods, a first time period during which the liquid ink fills firing chamber 130 and a second time period during which the volume of liquid ink in firing chamber 130 is stabilized after oscillating due to the effects of surface tension on the liquid ink at the opening of firing chamber 130. The total finite period of time for the reloading process typically establishes a practical maximum firing rate for firing all of the print nozzles of a particular print head during a given print cycle. For example, existing thermally-activated ink jet cartridges can fire a maximum rate of about 3,000 to 6,000 print cycles per second. For current piezo-electric print heads, maximum firing rates of up to 20,000 print cycles per second are possible due to the vacuum created in the firing chamber 130 which assists in moving the liquid ink from ink reservoir 122 to firing chamber 130, and due to the fact that there is no thermal cool-down period required to avoid the overheating of adjacent ejection mechanisms.

For thermally-activated ink jet print heads, in particular, it is common to use a predetermined firing sequence so as to avoid over heating of any print nozzle 128 and prevent the inadvertent firing of a print nozzle 128 near the print nozzle currently being fired. For all types of print heads having a multiplicity of print nozzles arranged in one or more print columns, the advantages of using a predetermined firing sequence are that the amount of circuitry required for head control logic 126 can be decreased as the operation of the control circuits is multiplexed to handle several different print nozzles during subsequent sub-cycles within the print cycle. It is also believed that a predetermined firing sequence aids in the refill process by decreasing the number of firing chambers 130 which are simultaneously being filled, thereby decreasing the tendency for fluid system oscillations that might result in inadvertent firings of print nozzles 128.

By combining the maximum firing rate of a print head with a desired pixel dot density, such as 300 dots per inch (DPI) (300 dots per 0.0254 meters), it is possible to determine the rate at which the print carriage will move across the print medium by dividing the maximum firing rate by the desired dot density, e.g., 4000/300=13.3 inches per second (IPS) (0.33782 meters per second). If print carriage 102 moves at this speed, print nozzles 128 will travel across the distance of one pixel (0.0033 inches or 0.08382 millimeters) during the time for one print cycle (0.00025 seconds). When the speed of print carriage 102 is combined with the total width of a print swath generated by print head 124, it is possible to determine how fast an image can be printed by a particular ink jet printer 100.

Figure 3:
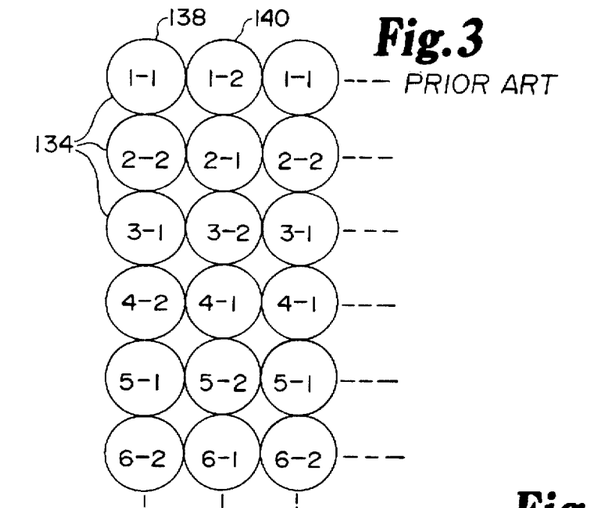
FIG. 3 is a pixel representation of a prior art two-pass printing technique used for printing transparencies.

Referring now to FIG. 3, one prior art technique for multipass printing will be described. FIG. 3 shows the pixel pattern produced by both passes of a two-pass printing mode described in U.S. Pat. No. 4,748,453 issued to Lin et al. In this multipass technique, a two pass printing mode is used to enhance print quality on a substrate having poor ink absorbing properties, such as a transparency, by using all of the print nozzles 128 in print head 124 to print every other pixel location 134 in accordance with a pair of complementary checkerboard patterns on each of two passes of print carriage 102 across print medium 106. In this case, all of the print dots labeled "−1" inside of a print dot 136 (e.g., print dot 138) are printed on the first pass and all of the print dots labeled "−2" inside of a print dot 136 (e.g., print dot 140) are printed on the second pass without advancing the print media. In FIG. 3, each print dot 136 also has a label (1–6) inside which indicates the print nozzle 128 responsible for printing that particular print dot 136 (e.g., print dot 138 which is labeled 1–1 is to be printed by print nozzle 1 during the first pass). It can be seen that, while only every other pixel location 134 is printed during each pass, each pass requires that all of the print nozzles 128 be fired during that pass in order to generate the complementary checkerboard pattern.

While the technique shown in FIG. 3 may work somewhat for paper, it did not prove useful for most other types of print mediums, particularly for transparencies. In fact, instead of increasing print quality, the multipass technique taught by Lin et al. tended to decrease print quality when the print medium was transparencies. This problem is pointed out in U.S. Pat. No. 4,999,646, issued to Trask. In the multipass technique taught by Trask, the two-pass approach taught by Lin et al. is modified for printing color images on paper by using overlapping print dots and DND imaging techniques employing a super pixel concept in order to obtain the advantages claimed by Lin et al. with respect to transparencies and the like for other types of print medium, such as paper. A sample of the pixel pattern produced using the multipass technique taught by Trask is shown in FIG. 4.

Figures 4, 5:
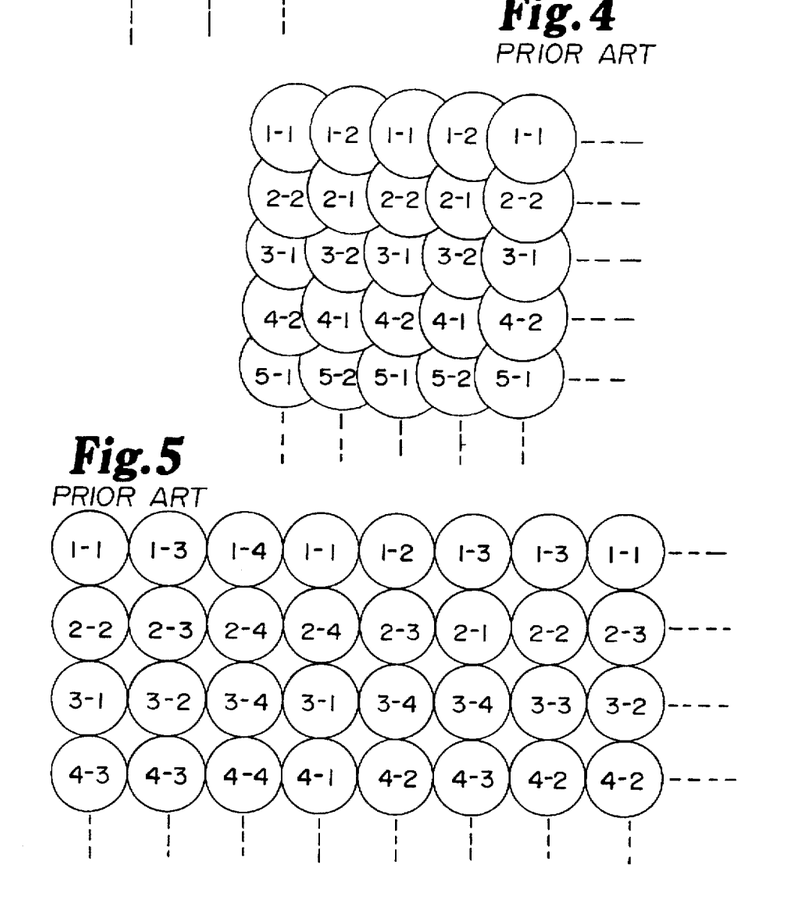
FIG. 4 is a pixel representation of another prior art two-pass printing technique used for printing on paper.
FIG. 5 is a pixel representation of a prior art four-pass printing technique for use with a print head which fires its print nozzles in a random firing sequence.

One problem with the Trask multipass technique as shown in FIG. 4 is that, while the overlapping of adjacent print dots may work for color print dots organized in a super pixel, the overlapping of adjacent print dots which are not in the same super pixel creates the very problem which Lin et al. was attempting to avoid. As a result, while the overall print quality is enhanced using the technique suggested by Trask, print quality problems remain. In addition, the use of DND imaging techniques and super pixels decreases the overall print density that is achievable by the ink jet printer due to the fact that multiple pixel locations are required in order to obtain one super pixel location. In other words, if 2×2 super pixel is used, the print density of a 300 DPI printer would be reduced to an effective print density of only 150 DPI.

An alternative approach for multipass printing with color ink jet printers is provided in a large format ink jet printer available from Encad, Inc., sold under the trademark NOVAJET II®. Instead of using a fixed pattern as taught by Lin et al. and Trask, the Encad ink jet printer teaches the utilization of an entirely random pixel pattern that is divided into four separate passes. FIG. 5 shows the pixel pattern produced using this totally random four pass multipass printing technique. In general, the print quality of the Encad technique is better than the print quality of either Lin et al. or Trask for most applications due to the introduction of an entirely random distribution of the printing of the print dots during the four passes.

The problem with the four pass printing technique utilized by the Encad ink jet printer is that the overall printing rate is now ¼th that of the normal one-pass printing rate. The NOVAJET II® does not increase the linear print head velocity when in four pass mode. As a result, while the print head for the Encad ink jet printer may have a maximum firing rate of 4,000 print cycles per second, the ink jet printer is limited to an effective linear print speed over all four passes that is equivalent to the linear print speed of a print head having a maximum firing rate of only 1,000 print cycles per second.

While the print quality improvements are significant, the improvements to print quality are made as a result of the direct sacrifice in linear print speed of the Encad ink jet printer, as is the case in all commercially known multipass printing techniques. It is typical in multipass printing techniques that the effective linear print speed of the print head is decreased by the number of passes which are used for the multipass printing technique.

One possible suggestion to increase both linear print speed and print quality is made in a passing comment in Lin et al that, because each print nozzle is fired only at every other horizontal pixel location, the traverse speed of the printing carriage could be doubled on each pass. There are several problems with the approach suggested by this passing comment. First, no suggestion is provided as to how to implement the speed up of the print carriage and maintain the enhanced print quality which Lin et al. is seeking. Second, none of the multipass techniques after Lin et al. have implemented or expanded on this suggestion. Lin et al. does not advance the print media in fractional increments to minimize banding, does not recognize dot gain problems, and does not recognize the need to disperse ink dot placement error in general. Most importantly, the suggestion in Lin et al. does not address the particular problems of print heads which use a predetermined firing sequence to optimize the firing order of individual print nozzles in the print head.

SUMMARY OF THE INVENTION

The present invention is a method and apparatus for controlling an ink jet printer in a multipass printing mode. The ink jet printer includes at least one print head mounted on a selectively movable print carriage for selectively dispensing a liquid ink onto a print medium in accordance with a pixel representation of an image. The print heads selectively print a series of columns of print dots at pixel locations in a print swath having at least four pixel rows as the print carriage is moved across the print medium.

In accordance with a first embodiment of the present invention, the print swath is printed while fractionally advancing the print media after each of at least four passes of the print carriage across the print medium. During each of the at least four passes, print dots are printed only at a portion of the pixels locations in the print swath such that no pixel location to be printed on a pass is orthogonally or diagonally adjacent to any other pixel location to be printed in the same pass. A new print swath is begun while the previous swath is being completed.

In accordance with a second embodiment of the present invention, the print swath is printed while fractionally advancing the print media after each of at least four passes of the print carriage across the print medium. During each of the at least four passes, the print carriage is moved across the print medium at a speed that is greater than a maximum firing rate for the print head divided by a print dot density for the ink jet printer.

In accordance with a third embodiment of the present invention, a printer controller for controlling the print head selectively prints only a portion of the print dots at the pixel locations in the print swath during each of at least four passes of the print carriage across the print medium. To improve the print quality, the portion of the pixel locations for each pass being chosen such that no pixel location to be printed on that pass is orthogonally or diagonally adjacent to any other pixel location to be printed in the same pass. To control dot placement error, the print media is fractionally advanced on every pass. To improve the linear print speed, the print carriage is moved across the print medium at a speed that is greater than a maximum firing rate for the print head divided by a print dot density for the ink jet printer, but less than the maximum firing rate of the print head divided by print dot density and divided by the number of passes used to print the full swath width.

In a preferred embodiment, the portion of the pixel locations to be printed on each pass are chosen by the printer controller by logically combining a unique pass mask for each pass with the pixel representation for the pixel locations in the print swath to determine a pixel pass representation of the pixel locations to be printed for that pass. The pixel pass representation is then provided to the print head to selectively print the one or more columns of print dots at pixel locations in the print swath. This representation is selected such that no pixels are printed on the same pass that are orthogonally or diagonally adjacent to any other pixel printed on that pass. Preferably, the pixel pass representation is provided to the print head in accordance with a predetermined firing sequence for a plurality of print nozzles that comprise the print head for each of a plurality of print cycles. The predetermined firing sequence includes a plurality of sub-cycles, each sub-cycle firing a selected subset of the plurality of print nozzles in response to a control signal received by the print head during that sub-cycle. To further increase both the linear print speed and the print quality in the preferred embodiment, the printer controller determines whether any of the print nozzles are to be fired during a sub-cycle. If not, then no print control signals are sent to the print head for that sub-cycle and the printer controller skips to the next sub-cycle. Therefore, by skipping inactive sub-cycles, the printer places active dots closer to the desired location on the print line than would be possible if inactive sub-cycles had delayed the active sub-cycle from printing.

DETAILED DESCRIPTION OF THE PREFERRED EMBODIMENT

Figure 1:
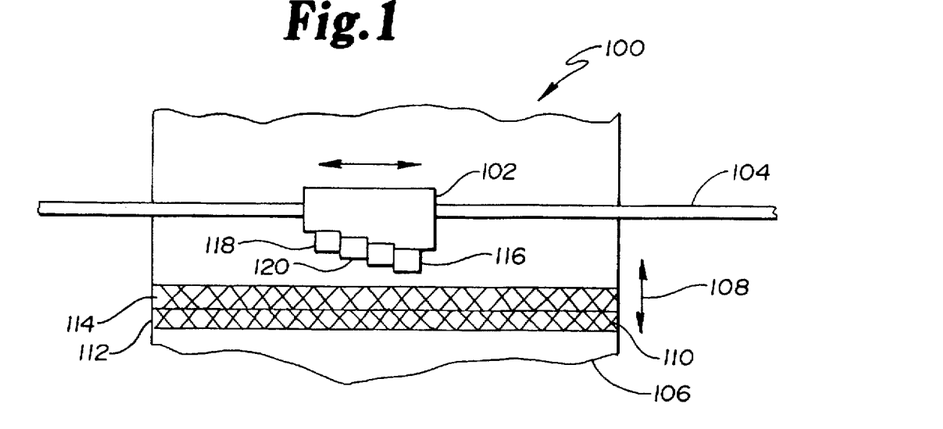
FIG. 1 is a schematic diagram of an ink jet printer suitable for use with the present invention.

Referring to FIG. 1, a preferred embodiment of a multiple print nozzle ink jet printer 100 suitable for use with the present invention includes a print carriage 102 mounted on a guide rail 104 for allowing print carriage 102 to traverse across a print medium 106. Print medium 106 is advanced past print carriage 102 in step increments in a print medium direction 108, each step increment generally defining a fraction of a print swath 110 comprised of two or more print rows of pixels. Print carriage 102 may traverse across print medium 106 in either a unidirectional or bi-directional manner. Print carriage 102 includes structure for removably mounting a plurality of ink jet cartridges 116, each of which contains its own source of liquid ink to be dispensed by a print head disposed on a face of ink jet cartridge 116 that is opposite print medium 106.

For color printing, or for faster monochromatic printing, cartridges 116 are preferably staggered in position relative to the print medium 106 direction 108 by a distance that fully exploits the full width of the printing head (e.g., one style of print head is 1/6 inch (4.23 millimeters) wide). In this way after cartridge 118 prints the first pass 112, the print media 106 is advanced some fraction of the print width of the printing head. For example, the fractional advancement might be such that print medium 106 is advanced by one-half the distance of the print width of the printing head between passes. The first cartridge 118 continues to print in this type of fractional manner until the next cartridge 120 is engaged in its first pass 112. Depending upon the inter-cartridge offset between cartridges 118 and 120, cartridge 120 may engage its first pass on the second pass of cartridge 118 or may engage its first pass after cartridge 118 has completed four passes across the print swath. This sequential engagement of cartridges continues until all cartridges are engaged. Printing in this manner with fractional advacement between successive passes takes advantage of the ink dot dispersion capacity of the fractional advancing paper. If the number of cartridges doubles, then each of the colors of the ink cartridges and the fractional advances spread may be doubled.

Figure 2:
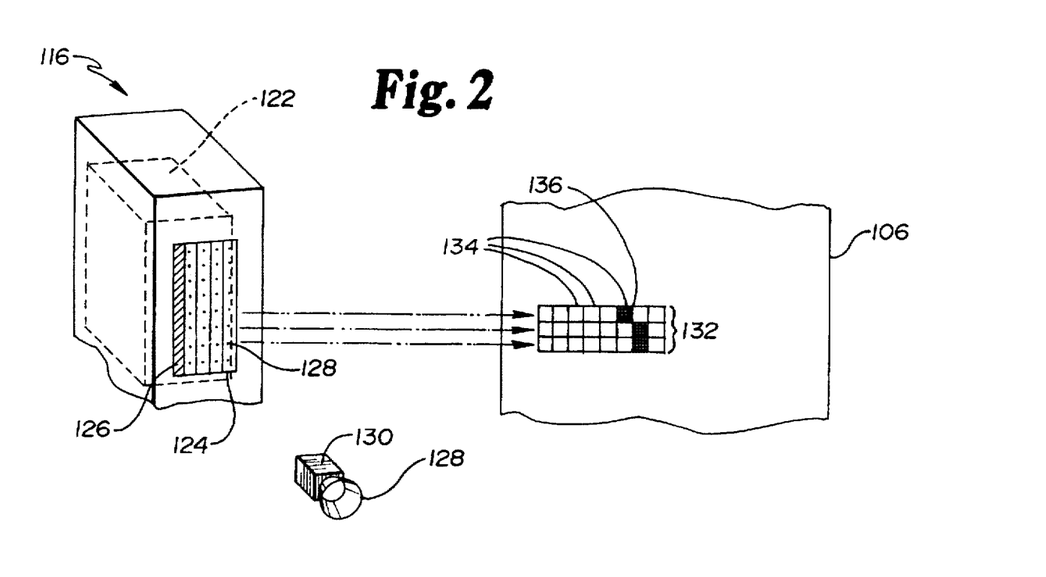
FIG. 2 is a schematic diagram of an ink jet cartridge of a preferred embodiment of the present invention including an exploded representation of the arrangement of print nozzles on the face of the ink jet cartridge.

Referring to FIG. 2, a schematic diagram of a preferred embodiment of multiple print nozzle ink jet cartridge 116 is shown. Cartridge 116 includes an ink reservoir 122 and a print head 124 on a bottom surface of cartridge 116 comprised of a plurality of print nozzles 128 each having a firing chamber 130 and an ink ejection mechanism (not shown). Each firing chamber 130 is in fluid connection with ink reservoir 122 and each ink ejection mechanism is operated in response to a head control signal received at connector 126. Each print nozzle 128 corresponds with a unique pixel row 132 as print carriage 102 makes each pass across print medium 106. As print head 124 passes by a pixel location shown by dotted lines 134 on print medium 106, if a print dot 136 is to be printed at that pixel location 134, the ink ejection mechanism for the particular print nozzle 128 which corresponds to that pixel location is fired in response to a head control signal received at connector 126. After an ink droplet has been ejected from firing chamber 130 to the desired pixel location 134 on print medium 106, liquid ink refills firing chamber 130 from ink reservoir 122 so that print nozzle 128 is ready to print another print dot 136 at the next active pixel location 134 on print medium 106.

It is desirable to use a predetermined firing sequence for firing all of the multiplicity of print nozzles in a print head during a print cycle such that no adjacent print nozzles are fired at the exact same firing time, or even in successive firing times. There will be small differences in the horizontal position of the edges of the pixels printed by print nozzles fired at different absolute times during the same print cycle. This is a result of the print carriage continually moving across the print medium and the result of the print nozzles in the print head not being fired at exactly the same time during each print cycle. Because the actual time it takes to fire or eject the droplet from the nozzle is only a small fraction of the time it takes to refill the firing chamber (e.g., 5 microseconds out of the 250 microsecond print cycle time), this difference in the horizontal position of the edges of the pixels is not very noticeable and is often masked by mechanical variations of the print carriage or print head, for example.

Figure 6:
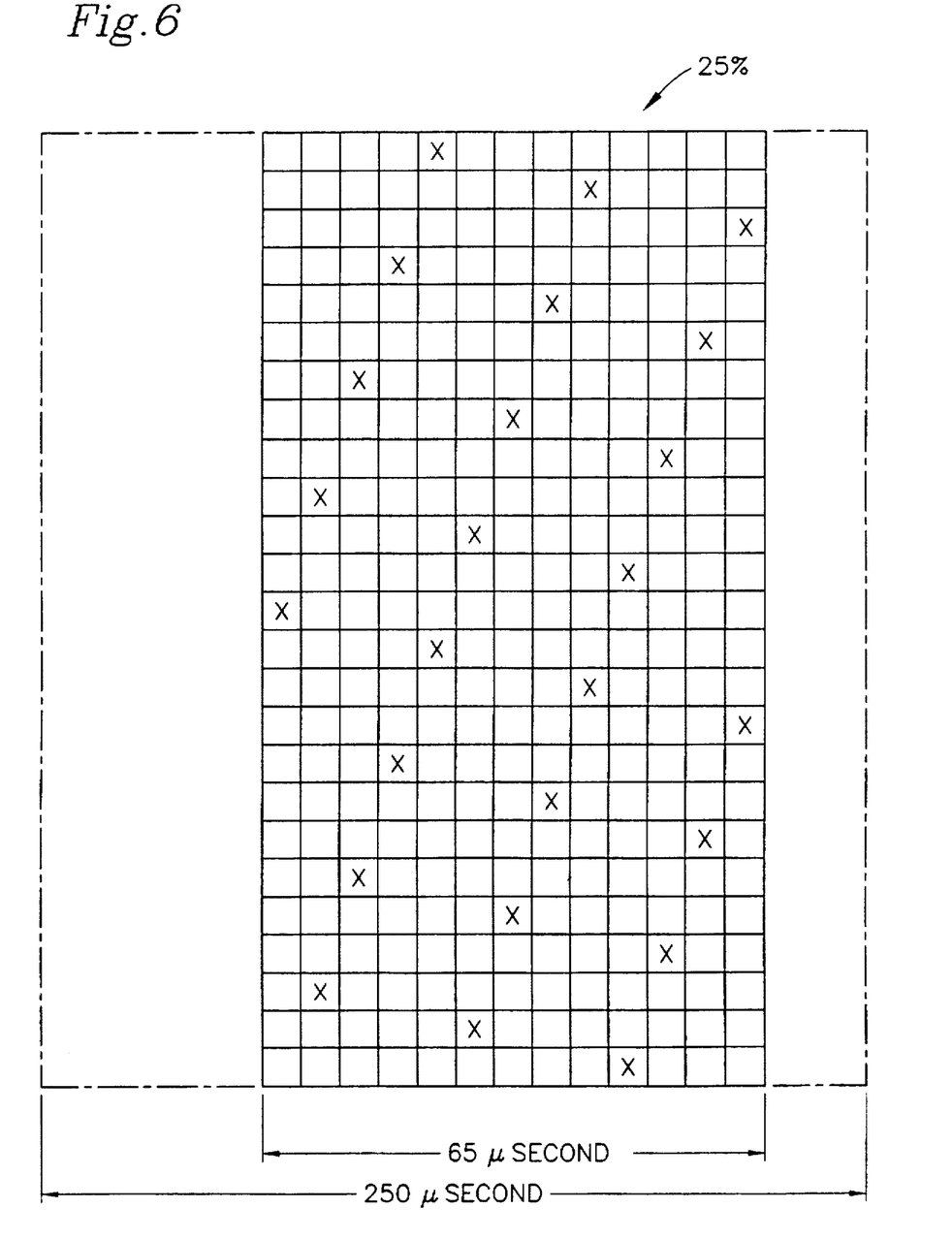
FIG. 6 is a detailed pixel representation of a single print cycle printed by the print head of FIG. 2.
Figure 7:
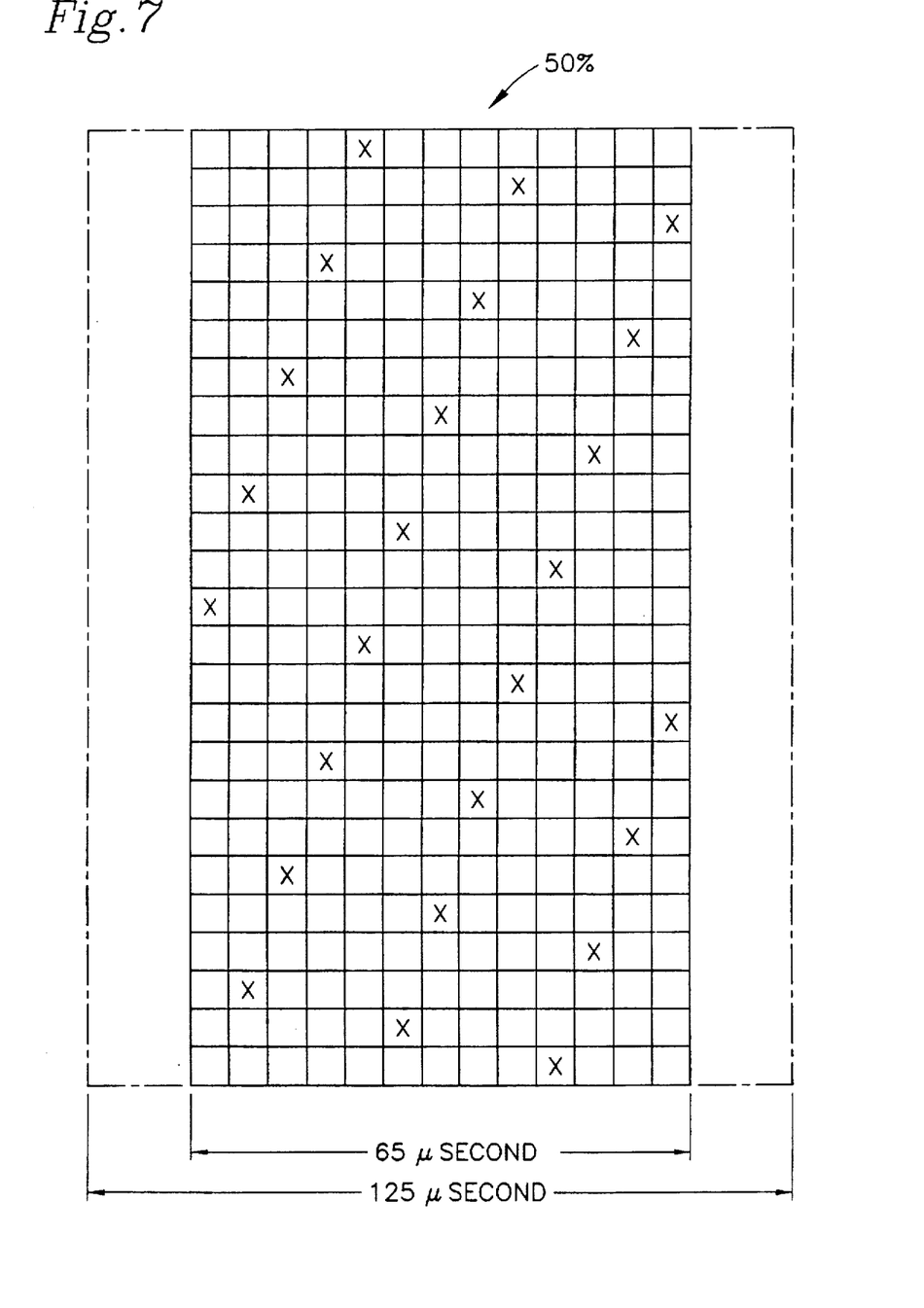
FIG. 7 is a detailed pixel representation similar to FIG. 2 showing the decrease in print quality when the print carriage is moved at twice the speed.

When the speed of the print carriage is increased, however, the length of the print cycle time is decreased proportionally and the individual jet firing time becomes a larger fraction of the print cycle. As an example, assume that the suggestion made in Lin et al. were used with the Encad ink jet printer where the ink jet cartridges have print heads that include two staggered columns of twenty-five print nozzles in each column which are fired sequentially in a print cycle that has thirteen sub-cycles. In this print head, four spaced apart print nozzles are fired during each sub-cycle that last for about 5 microseconds. Thus, in the case where the print carriage is moved at the standard 13.3 IPS, of a 300 DPI system the total variation in horizontal position of the edges of the thirteen pixel subgroups will be about 25% or 1/1200 of and inch (0.0211 millimeters) of the print head resolution (e.g., 13*5 microseconds/250 microseconds print cycle time), as shown for example in FIG. 6. Unfortunately, when the print carriage speed is doubled to about 26.6 IPS, the variation in horizontal position of the edges of the thirteen pixel subgroups increase to about 50% or 1/600 of an inch (0.0423 millimeters) of the print head resolution (e.g., 13*5 microseconds/ 125 microseconds print cycle time), as shown for example in FIG. 7. If the speed of the print carriage is quadrupled, the total variation in horizontal position of the edges of the thirteen pixel subgroups becomes almost 100% or 1/300 of an inch (0.0847 millimeters). In other words, the beginning edge of one pixels may be printed at the trailing edge of another pixel, even though both pixel were supposed to have been printed in the same print cycle. This amount of variation in pixel edge location can not be masked by mechanical variations in the print carriage or print head. The result is that if the speed of the print carriage is increased above the speed dictated by the maximum firing rate of the print head for print heads which fire the print nozzles in a predetermined sequence, a series of vertical wavy lines are noticeable in the printed image and the overall print quality is decreased as speed increases.

In the preferred embodiment of the present invention, print head 124 utilizes a predetermined firing sequence that precludes the simultaneous or contiguous firing of adjacent print nozzles 128, print head 124 is divided into four quadrants (I, II, III and IV) as shown. Twelve print nozzles 128 are situated in quadrants I and II and thirteen print nozzles 128 are situated in quadrants III and IV. During each print cycle for ink jet cartridge 116 as shown in FIG. 2, head control logic 126 direct thirteen separate sub-cycles by simultaneously firing a selected one of print nozzles 128 in each quadrant. In this way, four print nozzles 128 are simultaneously fired during each sub-cycle, except for the last sub-cycle when only two print nozzles 128 are fired; however, the firing sequence is selected such that none of the print nozzles 128 fired in any given sub-cycle are adjacent to one another or adjacent to a print nozzle which was fired in the previous sub-cycle or which will be fired in the succeeding subcycle. Head control logic 126 cycles through the predetermined firing sequence to determine whether any set of print nozzles 128 will be active on any given sub-cycle. For each sub-cycle, a four-bit pixel firing code dictated by a pixel representation of the image to be printed is used to determine which of the four print nozzles 130 that is active for that sub-cycle will actually be fired. If none of the print nozzles 128 in a particular sub-cycle are to be fired, head logic 126 skips the present sub-cycle and moves to the next sub-cycle.

The specific dimensions of print nozzles 128, the size of firing chambers 130, the advancement of print medium 106 and the timing of the print cycle will depend on the particular resolution of the pixel to be printed. For example, for a thermally-activated ink jet cartridge of a preferred embodiment that is capable of printing 300 DPI. As discussed in the background section, for a 300 DPI ink jet printer having a maximum firing rate of 4000 print cycles per second, print carriage 102 will traverse across print medium 106 at a maximum constant speed of about 13.3 IPS. As a result, each print nozzle 128 traverses across the width of one pixel (1/300th inch or 0.08467 millimeters) during each print cycle. For cartridge 116 as shown in FIG. 2 in which there are twenty-five print nozzles 128 in each print column 34, print medium 106 is advanced 1/24 inches (1.0583 millimeters) in print medium direction 108 at the end of each print pass. For this ink jet cartridge 116, each print cycle is about 250 microseconds and each print sub-cycle is about 5 microseconds, consisting of 2 microseconds to actually eject the ink droplet from firing chamber 130 and 3 microseconds of delay. In the preferred embodiment, cartridge 116 is preferably a high-capacity, thermally-activated type of ink jet cartridge of the type described, such as a High Capacity Ink Jet Cartridge, available from Hewlett-Packard Company.

Figure 8:
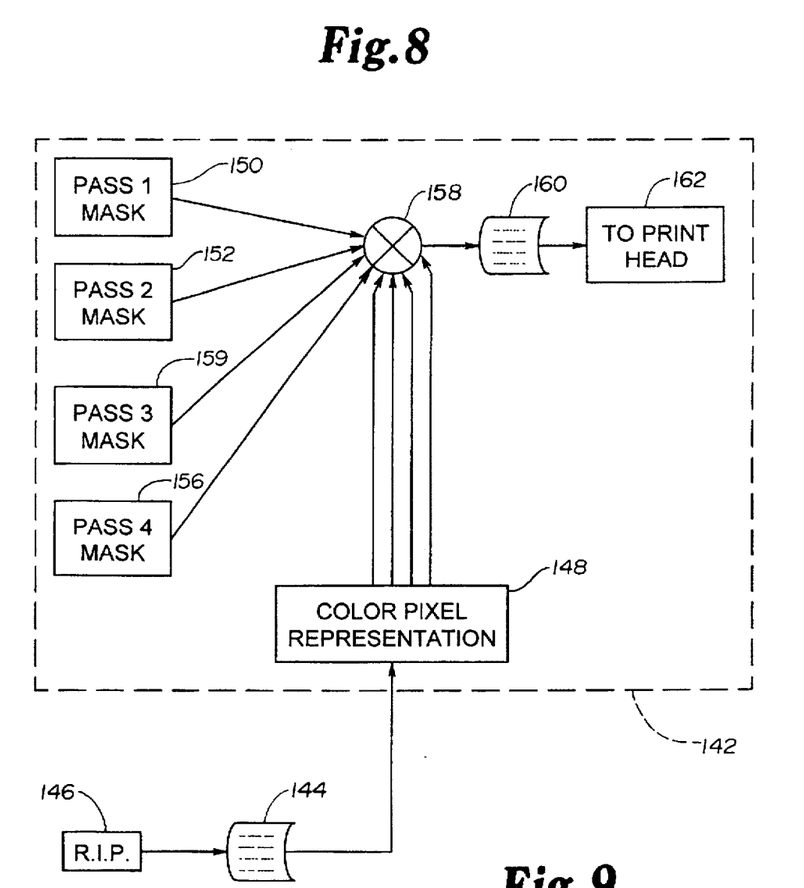
FIG. 8 is a block diagram showing the printer controller for a preferred embodiment of the present invention.

Referring now to FIG. 8, a block diagram of a preferred embodiment of the printer controller for the present invention is shown. Printer controller 142 includes software and hardware necessary to receive a color pixel representation 148 of one color of a color pixel representation 144 that is generated by a raster image processor 146. For a four color image, there would be four color pixel representations 148, one for each color. In the preferred embodiment, printer controller 142 receives color pixel representation 144 and separates the individual color information into each color pixel representation 148. Each color pixel representation 148 is then selectively combined with one of four pass masks 150, 152, 154 and 156, each of which have a binary indication of which pixel locations 136 will be activated to be printed on which pass. On each pass, color pixel representation 148 is logically combined with the appropriate pass mask 150 by combiner logic 158 to produce a pixel pass representation 160 which is then sent 162 to print head 124.

Figure 9:
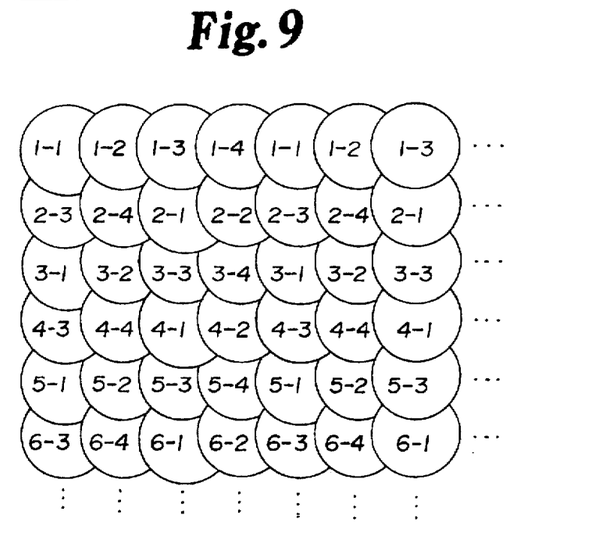
FIG. 9 is a representation of a pass mask used by the printer controller shown in FIG. 8.

Referring now to FIG. 9, pixel representations of a preferred embodiment of the present invention are shown. As with FIGS. 3, 4 and 5, each print dot 136 has an indication as to which print nozzle 128 printed that print dot 136 at that pixel location 134 (i.e., nozzle 1–6) and as to which pass the print dot 136 was printed on (i.e., pass "−1 to −4"). In FIG. 9, no adjacent pixel locations 136, either orthogonally or diagonally, are printed on the same pass. In addition, pixel locations 134 which are printed in the same pass are three pixels apart horizontally (i.e., in the same pixel row), two pixels apart vertically (i.e., in the same pixel column), and two root two (2√2) pixels apart diagonally.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:

1. A method for controlling an ink jet printer having at least one thermally activated print head having a plurality of nozzles mounted on a selectively movable print cartridge for selectively dispensing a liquid ink onto a print medium in accordance with a pixel representation of an image to selectively print a series of columns of print dots at pixel locations in a current print swath having at least four pixel rows as the print carriage is moved across the print medium, the method comprising the steps of:

(a) printing the current print swath using at least four passes of the print carriage across the print medium before advancing the print medium to an entirely new print swath;

(b) during each of the at least four passes, only printing print dots at a portion of the pixel locations in the current print swath such that no pixel location to be printed on a pass is immediately adjacent to any other pixel location to be printed on the pass; and, (c) during each of the at least four passes, moving the print carriage across the print medium at a speed that is greater than a maximum firing rate for the print head divided by a print dot density for the ink jet printer;

wherein step (a) includes the step of:

(a1) emitting ink from select ones of said plurality of nozzles under electronic control to print said print dots in a series of print cycles such that none of said print dots are printed by a first nozzle disposed adjacent to a second nozzle which has printed a print dot in any of an immediately prior, a present, and an immediately succeeding print cycle.

2. The method of claim 1 wherein the print head is a thermally-activated ink jet cartridge print head and the predetermined firing sequence for the immediately prior, the present, or the immediately succeeding print cycle is comprised of a plurality of print sub-cycles, each of said sub-cycles firing a selected subset of the plurality of nozzles, so that only a single select nozzle of the selected subset of the plurality of print nozzles is fired per sub-cycle in response to an electronic control signal received by the print head.

3. The method of claim 1 wherein said print head includes two staggered columns of a plurality of print nozzles and each of said columns of print dots to be printed per sub-cycle is printed by said two staggered columns of a plurality of nozzles on the print head.

4. The method of claim 1 wherein step (b) comprises the steps of:

(b1) for each of said passes logically combining a unique pass mask with a pixel representation for the pixel locations in the current print swath to determine a pixel pass representation of the pixel locations to be printed; and (b2) for each of said passes providing the pixel pass representation to the print head to selectively print the one or more columns of print dots at pixel locations in the current print swath.

5. The method of claim 4 wherein step (b2) further comprises the steps of:

(b21) for each of the series of columns of print dots to be printed, providing the pixel pass representation to the print head in accordance with a predetermined firing sequence for each of said print cycles for the plurality of nozzles of the print head;

(b22) if any of the nozzles are to be fired for a column of the print dots to be printed, sending a print control signal representative of a portion of the pixel pass representation for said nozzles to be fired to the print head; and (b23) if any of the nozzles are not to be fired for the column of the print dots to be printed, not sending a print control signal to the print head for said nozzles not to be fired.

6. The method of claim 1 wherein the ink jet printer is a color printer having at least a plurality of print heads including said print head and the pixel representation of the image includes a pixel representation for each of a plurality of colors, and each of said print heads is for printing a color liquid ink corresponding to one of the plurality of colors.

7. The method of claim 1 wherein step (a) includes the step of:

(a1) fractionally advancing the print medium after each of said passes by a distance that is a fraction of an effective width of the print head such that the print medium is advanced to the new print swath after the at least four passes are complete.

* * * * *